Sheet 1, 2 Sheets.
C. Duckworth.
Shuttle Boxes.
No. 21,019. Reissued Jul. 4, 1865.
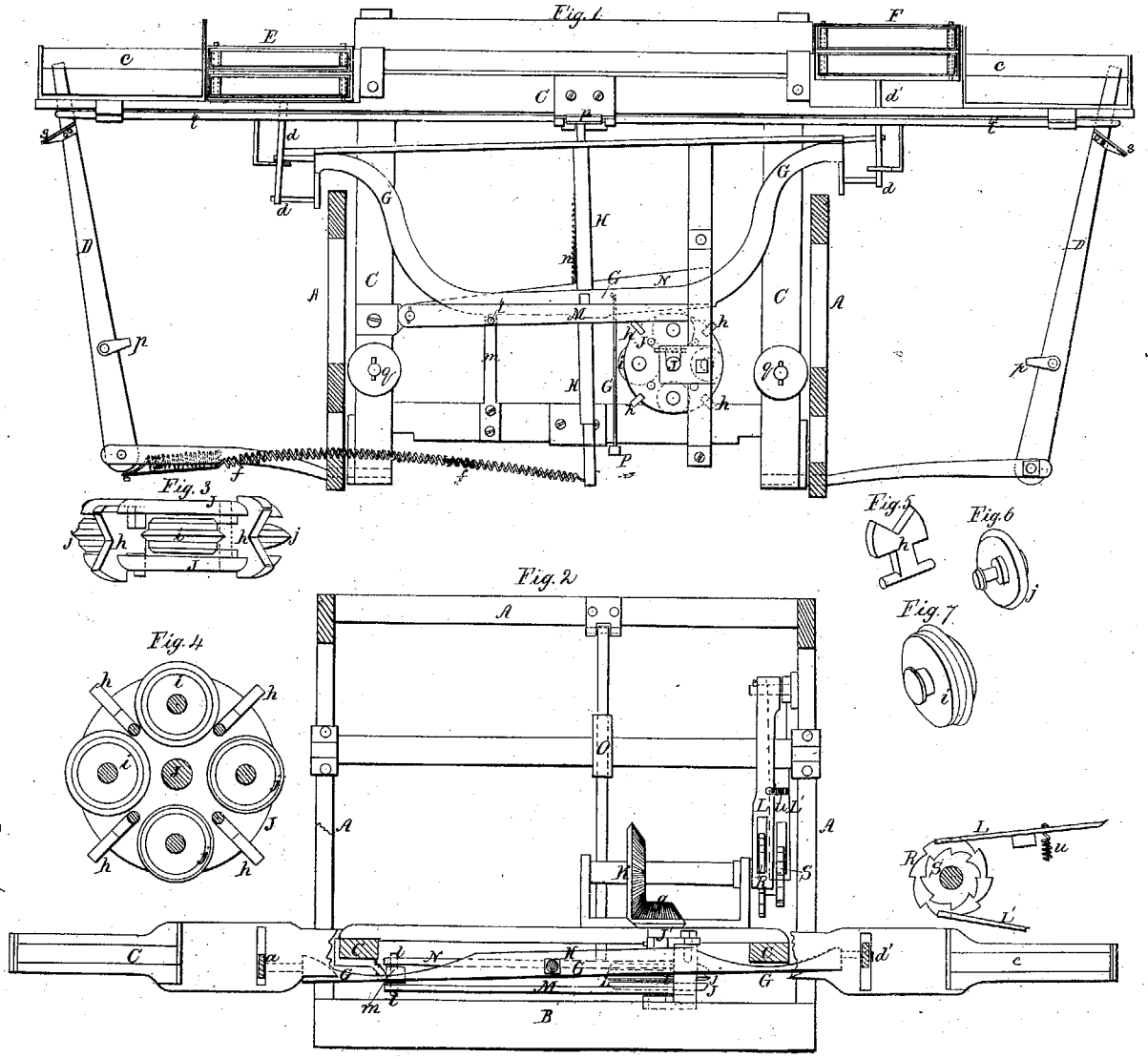
Witnesses
R. F. Gempler
E. Schafer
Inventor
C. Duckworth
by his Attys
Mason, Fenwick & Lawrence
N. PETERS, PHOTO-LITHOGRAPHER, WASHINGTON, D. C.

C. Duckworth
Shuttle Boxes
No. 2,019.
Reissued Jul. 4, 1865.
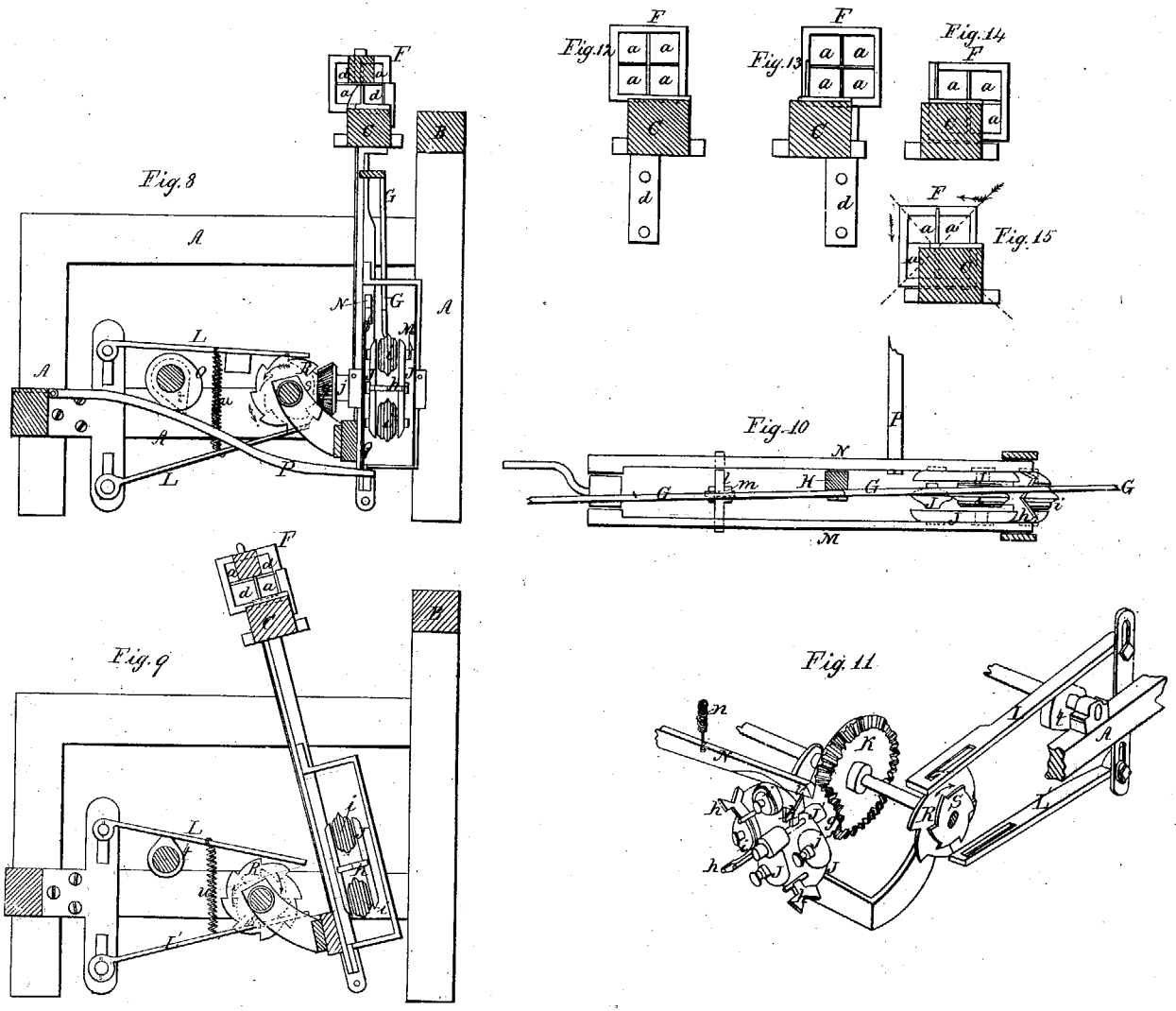
Witnesses
R. T. Campbell
E. Schafer
Inventor
C. Duckworth
by his Attys
Mason, Fenwick & Lawrence
N. PETERS, PHOTO-LITHOGRAPHER, WASHINGTON, D. C.

UNITED STATES PATENT OFFICE.

CHRISTOPHER DUCKWORTH, OF MOUNT CARMEL, CONNECTICUT.

IMPROVEMENT IN LOOMS.

Specification forming part of Letters Patent No. 9,815, dated June 28, 1853; Reissue No. 2,019, dated July 4, 1865.

DIVISION No. 2.

*To all whom it may concern:*

Be it known that I, CHRISTOPHER DUCKWORTH, of Mount Carmel, in the county of New Haven and State of Connecticut, have invented certain new and useful Improvements on Power-Looms for Weaving Figured Fabrics; and I do hereby declare that the following is a full, clear, and exact description of that part of my invention which relates to Division No. 2, reference being had to the accompanying drawings, making a part of this specification, in which—

Figure 1, Sheet 1, is a front elevation of those parts of a power-loom to which my invention relates. Fig. 2, Sheet 1, is a horizontal section through Fig. 1, taken immediately beneath the race-beam. Figs. 3, 4, 5, and 7 are views in detail of the devices which take part in effecting the changes of position of the shuttle-boxes. Fig. 8, Sheet 2, is a longitudinal section through the center of the loom, with the beveled spur-wheel omitted. Fig. 9, Sheet 2, is a similar section showing the same parts in different positions. Fig. 10, Sheet 2, is a top view of the levers which give a horizontal lateral movement to the shuttle-boxes either backward or forward. Fig. 11, Sheet 2, is a perspective view showing the pawls, ratchet-wheels, and spurred gearing, which move the tappet-wheel about their common center, either to the right or to the left. Figs. 12, 13, 14, and 15 show the changes of position of a four-celled shuttle-box.

Similar letters of reference indicate corresponding parts in the several figures.

My invention relates particularly to power-looms for weaving figured fabrics, where more than two colors are required in the weft and where it is necessary to employ a number of shuttles corresponding to the number of colors used and to change the positions of the shuttle-boxes with respect to the race-beam according to the figure which it is desired to weave.

The object of my invention is to provide for throwing shuttles from a combination of shuttle boxes or cells, both in regular and irregular order, so that a great variety of combinations can be made with but few colors and few shuttles carrying such colors.

In looms hitherto constructed, having a number of shuttle-boxes corresponding to the number of shuttles employed, it is necessary to throw the shuttles in regular order of arrangement in the boxes, and while provision is made for giving these boxes alternate movements for the purpose of obtaining a repetition of a certain number of colors previously used, there is no provision made to pass by or skip a box which is next that from which the last shuttle was thrown. Thus, while different colors can be repeated in their regular order of arrangement any number of times by giving the boxes an alternate movement, such movement will not admit of the taking of any desired color at will, but the operation of the machine is limited to the taking of only such colors as range in regular succession. If, for example, the color red was thrown and it was desired to succeed it with white, unless the latter color was in the box next the red it could not be thrown until the colors in the intermediate boxes were thrown. Hence, with such looms it is necessary to employ a great number of shuttles to weave a simple figure of but few colors.

To enable others skilled in the art to understand my invention, I will describe its construction and operation.

The frame A, the breast-beam B, the lathe C, and the picker-staves D D may be constructed in any of the well-known ways used in power-looms. The shuttle-boxes E and F are subdivided by partitions, so as to form a number of cells, *a a a*, for containing the shuttles, and these boxes are so arranged that they are susceptible of receiving a lateral, a vertical, and a diagonal movement when necessary to bring the required shuttle to the position to be acted upon by the picker-staves D D, which latter give an alternate reciprocating motion to their respective bolts or rods, which are inclosed within the horizontal tubes *c c*. The shuttle-boxes E F are supported upon upright standards, *d d'*, Figs. 1 and 2, which standards are acted upon by means of pins projecting from the extremities of a curved rocking-lever, G. This lever G is secured at its center to a swinging bar, H, which is supported in a free bearing at its upper end, (attached to the race-beam of the lathe C,) while its lower end is movable laterally in a slotted plate, *e*, and is pressed toward the left by the spiral spring *f*, so as to cause the lever G to bear in the center of the notches in the slides *h* and rest on the friction-rollers *i i* and *j j*, contained in the circular case J. This case J, with its friction-rollers, is revolved or oscillated, when necessary, by the bevel gear-wheels K *g*, Figs. 2 8, and 11, these wheels being worked by the dogs or pawls L L and ratchet-wheels R S, Figs. 8 and 11, by the vibratory motion of the lathe C, to which latter the case J, wheels *k* and *g*, and the ratchet-wheels are all attached.

The two pawls L and L′ may, for some purposes, be worked by a cam, as shown at *t*, Figs. 8, 9, and 11, which cam will raise the pawl L from the ratchet-wheel R, which by means of the spiral spring *u*, will lift the pawl L′ against the ratchet-wheel S, so as to move the case J about its axis in one direction, contrary to that in which it is moved when the pawl L is allowed to act upon the ratchet-wheel R; but instead of using a single cam, *t*, to act upon the pawls L L′, I shall in most, if not all, cases employ a "card-pattern" for moving and controlling the movements of said pawls.

The case J contains four friction-rollers, *i i* and *j j*, the forms of which are particularly shown in Figs. 6 and 7, Sheet 1. The object of making these portions *i i j j* of a circular form and allowing them to turn freely is merely to avoid friction when their surfaces are caused to act upon the lever G. The case J is also furnished with four notched slides, *h*, the notches of which guide the lever G laterally as it falls into them. These slides *h* are moved from one side to the other of the center of the case J by means of two levers, M and N, which are alternately depressed so as to bring the beveled edge of one or the other of these levers in contact with the projecting portions of these slides. The slides *h* have sufficient end play to carry the lever G from one side to the other of the central prominences of the tappets or friction-rollers *i i j j*, and thereby cause this lever to give the lateral motions to the shuttle-boxes as the levers M and N are alternately depressed. The friction-rollers *i i j j* are used for giving a vertical up-and-down movement to the shuttle-boxes as the shaft J′ is moved about its axis, and the slides *h h* are used for giving a lateral or horizontal movement to the shuttle-boxes. Both devices operate as tappets upon the lever G, which carries on its extremities the shuttle-boxes.

The levers M and N are pivoted to a bracket, which is secured to the left-hand sword of the lathe, and these levers are connected together by a short transverse lever, *l*, which rocks on a fulcrum, *m*, so that when one lever is depressed the other will be elevated. The lever N is elevated by the recoil of the spiral spring *n*, the upper end of which is attached to the under side of the race-beam of the lathe C and the lower end to the lever N, as seen in Fig. 1, and this lever is depressed by the action of the cam O on the lever P by means of the connecting-rod Q; and, by the operation of the rocking lever *l*, when lever N is elevated, the lever M is depressed, and vice versa, so far as the cam O is concerned, in the operation while working alone. This cam O may be shifted or adjusted to any desired position, so as to operate the levers M and N, as required, to the extent to which a single cam can be used; but I prefer to control the operation of the levers M and N by means of a card-pattern, instead of a single cam-surface, as shown.

When the card-pattern is employed, the cam O should be dispensed with and the operation of the levers governed wholly by the pattern, the operation of the rocking lever *l* being to prevent both levers M N from being depressed simultaneously, while the operation governed by the pattern may be to hold up either one of the levers for any length of time.

On the arbor of wheel K, I key two ratchet-wheels, R and S, for the purpose of revolving the wheel K either way by means of the vibratory motion given to the lathe C and the stationary pawls L L′, acting alternately upon their respective ratchet-wheels, as represented in Figs 8 and 9, Sheet 2. Either one of these pawls may be raised or depressed, or both may be disengaged from the ratchet-wheels when not needed, by any of the common methods used in looms to direct the form of the figure to be woven, though they must be governed by a card-pattern, either directly or indirectly.

The power for working the lathe C may be applied in any of the well-known ways so as to revolve the main shaft, which latter communicates a rotary motion to the shaft carrying the cam O through the medium of spurred gearing, which I have not represented in the drawings.

When power is applied to the main driving-shaft, the lathe C receives a vibratory motion for beating up the woof or filling. This vibratory motion of the lathe causes the ratchet-wheels R S to be revolved by the pawl L in the direction indicated by the arrows in Fig. 8, and to carry with it the bevel spur-wheel K, which, by means of the pinion *g* on the shaft J′, revolves or moves the case J toward the right by a repeated movement. And when the other pawl, L′, is brought into action, as in Fig. 9, Sheet 2, the motion of the lathe C causes the ratchet-wheel S to revolve in the direction indicated by the arrows on this wheel in Fig. 9, and carries with it the wheel K, which, by means of pinion *g*, revolves or moves the case J over toward the left by a repeated movement, so as to bring the notched slides *h* and friction-rollers *i i j j* alternately or successively under the lever G to guide it and to rock it so as to alternately depress and elevate the shuttle-boxes E F or to give them a vertical motion. While this takes place the shaft of cam O will be revolved, and this cam will be caused to depress the lever P once in every revolution, and, by means of the connecting-rod Q, depress the lever N, so that its beveled edge will force the notched slides outward and thus guide the lever G outside of the prominences on the rollers or tappets *i i j j*, and thus give the lateral motion to the shuttle-boxes, carrying the box E back and bringing the box F forward.

When the shortest side of the cam O is downward, the spiral spring *n* Fig. 1, will raise the lever N above the ends of the slides *h*, and by the operation of the transverse lever *l* the lever M will be correspondingly depressed, (unless sustained by the governing effect of a card-pattern,) so that its beveled edge will come into contact with the beveled edges of the notched slides *h* and force these slides back, and thereby guide the lever G to the back side of the central prominences on the friction-rollers or tappets, and cause this lever to carry the shuttle-box F backward and bring box E forward, thus giving a lateral movement to the shuttle-boxes opposite to that before described.

When the change in the slide, to give the lateral or horizontal movement to the boxes, coincides with a change in the friction-rollers or tappets, as from *i* to *j*, or vice versa, to give the vertical movements, the lateral and vertical movements occurring simultaneously will produce the diagonal motion, as from corner to corner of the shuttle boxes, as indicated by the red lines, Fig. 15. The slides *h* and rollers or tappets *i i j j*, when the pawls L L′ and the levers N M are properly controlled in their movements, will cause the lever G to produce every change of position of the shuttle-boxes required to weave the desired figure. The case J may remain at rest during any number of throws of either one of the shuttles, and this case may be rotated forward or backward as one or the other of the pawls L L′ and ratchet-wheels R S are used, and when the pawl L and the ratchet-wheel S are used, the inclined surface *v*, Fig. 11, will operate the notched slides *h*. When I employ a card-pattern, I connect it with the pawls L L′ and the levers M N by any of the well-known means now in use for similar purposes, according to the construction of the loom.

The picker-staves D D may be operated in any of the well-known ways—as, for instance, by bands or straps attached at *p p* and carried over the pulleys *q q*, Fig. 1, and worked by a treadle or any other convenient way.

The loom may be stopped when the shuttles are not thrown home into the boxes by the lip or projection *r*, Fig. 1, (which is thrown by a spring in the usual manner,) coming in contact with the breast-beam B, and when the shuttle is thrown home into the boxes the inclined planes *s s*, acting on the bent ends of the protecting-rod *t′*, will press the lip *v* down, so that it will pass under the breast-beam B and allow the lathe to work freely.

Having thus described my invention, what I claim as new, and desire to secure by Letters Patent, is—

1. Giving an alternate movement to shuttle-boxes in a vertical plane by means of pawls, reversible tappets, and a contrivance which will automatically control the movements of said pawls, substantially as described.

2. Giving an alternate movement to shuttle-boxes in a horizontal plane by means of pawls, reversible tappets, and a contrivance which will automatically control the movements of said pawls, substantially as described.

3. Giving an alternate diagonal movement to shuttle-boxes by means of pawls, reversible tappets, and a contrivance which will automatically control the movements of the said pawls, substantially as described.

4. The combination of reversible tappets with shuttle-boxes, which are so applied to the loom that they will admit of being moved either laterally, vertically, or diagonally, substantially as described.

5. Giving an intermittent, oscillating, or rotary movement to a shuttle-box actuator by means of pawls and ratchet-wheels which are controlled by a cam-surface, *t*, or its equivalent, substantially as described.

6. The use of tappets which receive a forward and backward movement or a continuous rotary movement, in combination with many-chambered shuttle-boxes at both ends of the lathe, which boxes are connected together by a lever, G, and operated simultaneously by means of said tappets, substantially as described.

7. Giving a reciprocating movement to many-chambered shuttle-boxes of looms by means of contrivances which are controlled automatically in such manner that the boxes are moved a greater or less distance by a single vibration of the lathe, so as to throw the shuttles in regular order or to skip a shuttle, according to the figure which it is desired to weave, substantially as described.

CHRISTOPHER DUCKWORTH.

Witnesses:

R. T. CAMPBELL,

E. SCHAFER.